United States Patent
Nakagaito et al.

(10) Patent No.: US 11,453,926 B2
(45) Date of Patent: Sep. 27, 2022

(54) STEEL SHEET, PLATED STEEL SHEET, METHOD FOR PRODUCING HOT-ROLLED STEEL SHEET, METHOD FOR PRODUCING COLD-ROLLED FULL HARD STEEL SHEET, METHOD FOR PRODUCING STEEL SHEET, AND METHOD FOR PRODUCING PLATED STEEL SHEET

(71) Applicant: JFE STEEL CORPORATION, Tokyo (JP)

(72) Inventors: Tatsuya Nakagaito, Tokyo (JP); Yoshimasa Funakawa, Tokyo (JP); Yoshihiko Ono, Tokyo (JP); Hiroshi Hasegawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 953 days.

(21) Appl. No.: 16/089,846

(22) PCT Filed: Jan. 16, 2017

(86) PCT No.: PCT/JP2017/001237
§ 371 (c)(1),
(2) Date: Sep. 28, 2018

(87) PCT Pub. No.: WO2017/168958
PCT Pub. Date: Oct. 5, 2017

(65) Prior Publication Data
US 2020/0270717 A1  Aug. 27, 2020

(30) Foreign Application Priority Data

Mar. 31, 2016 (JP) .............................. JP2016-070746
Nov. 10, 2016 (JP) .............................. JP2016-219338

(51) Int. Cl.
*B32B 15/01* (2006.01)
*C21D 9/46* (2006.01)
(Continued)

(52) U.S. Cl.
CPC .............. *C21D 9/46* (2013.01); *B32B 15/013* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS

2011/0176613 A1  7/2011  Tsai et al.
2011/0220252 A1  9/2011  Hammer et al.
(Continued)

FOREIGN PATENT DOCUMENTS

CN  1286730 A  3/2001
CN  102803540 A  11/2012
(Continued)

OTHER PUBLICATIONS

Jan. 11, 2021 Office Action issued in Chinese Patent Application No. 201780020510.7.
(Continued)

*Primary Examiner* — Daniel J. Schleis
(74) *Attorney, Agent, or Firm* — Oliff PLC (57) ABSTRACT

A steel sheet having excellent fatigue resistance as a material for automobile parts and a TS of 590 MPa or more, and a method for producing the same. The steel sheet having a specified chemical composition and a microstructure of 50% or more and 90% or less of martensite, 10% to 50% of ferrite and bainite in total, in terms of an area ratio, and an average concentration of solute Mn in ferrite in a region from a
(Continued)

surface of a base steel to a depth of 0.5 μm is 60% or more relative to an average concentration of solute Mn in ferrite at a location of ¼ in the thickness of the steel sheet.

23 Claims, 1 Drawing Sheet

(51) Int. Cl.
| | |
|---|---|
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/12* | (2006.01) |
| *C22C 38/14* | (2006.01) |
| *C22C 38/38* | (2006.01) |
| *C23C 2/06* | (2006.01) |
| *C23C 2/28* | (2006.01) |
| *C23C 2/40* | (2006.01) |

(52) U.S. Cl.
CPC ........... *C21D 6/008* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/12* (2013.01); *C22C 38/14* (2013.01); *C22C 38/38* (2013.01); *C23C 2/06* (2013.01); *C23C 2/28* (2013.01); *C23C 2/40* (2013.01); *C21D 2211/002* (2013.01); *C21D 2211/005* (2013.01); *C21D 2211/008* (2013.01); *Y10T 428/12799* (2015.01)

(56) References Cited

U.S. PATENT DOCUMENTS

| | | | |
|---|---|---|---|
| 2012/0090737 A1 | 4/2012 | Fushiwaki et al. | |
| 2012/0325376 A1 | 12/2012 | Makimizu et al. | |
| 2013/0048157 A1 | 2/2013 | Ootsuka et al. | |
| 2013/0071687 A1 | 3/2013 | Takagi et al. | |
| 2013/0213534 A1 | 8/2013 | Hikita et al. | |
| 2016/0017473 A1 | 1/2016 | Takagi et al. | |
| 2016/0319385 A1* | 11/2016 | Hasegawa | C22C 38/38 |

FOREIGN PATENT DOCUMENTS

| | | |
|---|---|---|
| CN | 102833540 A | 12/2012 |
| CN | 103805840 A | 5/2014 |
| EP | 1 041 167 A1 | 10/2000 |
| EP | 1548142 A1 | 6/2005 |
| EP | 2031081 A1 | 3/2009 |
| EP | 2128295 A1 | 12/2009 |
| EP | 2145973 A1 | 1/2010 |
| EP | 2426230 A1 | 3/2012 |
| EP | 2 444 510 A1 | 4/2012 |
| EP | 2 921 569 A1 | 9/2015 |
| EP | 3050989 A1 | 8/2016 |
| EP | 3054025 A1 | 8/2016 |
| EP | 3173494 A1 | 5/2017 |
| JP | S58-22332 A | 2/1983 |
| JP | H11-199973 A | 7/1999 |
| JP | H11-350038 A | 12/1999 |
| JP | 2004-149812 A | 5/2004 |
| JP | 2010-255100 A | 11/2010 |
| JP | 2011-132576 A | 7/2011 |
| JP | 2011-195957 A | 10/2011 |
| JP | 2011-208181 A | 10/2011 |
| JP | 2012-12703 A | 1/2012 |
| JP | 2013-221198 A | 10/2013 |
| JP | 2013221198 * | 10/2013 |
| KR | 10-2009-0115873 A | 11/2009 |
| WO | 2015092982 A1 | 6/2015 |
| WO | 2015093043 A1 | 6/2015 |
| WO | WO2015093043 * | 6/2015 |
| WO | 2016013144 A1 | 1/2016 |

OTHER PUBLICATIONS

Jun. 30, 2020 Office Action issued in Chinese Patent Application No. 201780020510.7.
Jan. 3, 2019 Extended Search Report issued in European Patent Application No. 17773508.1.
Jan. 3, 2020 Office Action issued in European Patent Application No. 17773508.1.
Oct. 10, 2019 Office Action issued in Korean Patent Application No. 10-2018-7027657.
Apr. 13, 2020 Notice of Allowance issued in Korean Patent Application No. 10-2018-7027657.
Oct. 18, 2019 Office Action issued in Chinese Patent Application No. 201780020510.7.
Apr. 18, 2017 International Search Report issued in International Patent Application No. PCT/JP2017/001237.
May 23, 2022 Office Action issued in Chinese Patent Application No. 202110289284.0.
Dec. 30, 2021 Office Action issued in Chinese Patent Application No. 202110289284.0.
"Cold Rolled Steel Sheet Production". Metallurgical Industry Press, pp. 236-237, 2005.
"Metal Material and Heat Treatment". Beijing Institute of Technology Press, p. 88, 2012.

* cited by examiner

STEEL SHEET, PLATED STEEL SHEET, METHOD FOR PRODUCING HOT-ROLLED STEEL SHEET, METHOD FOR PRODUCING COLD-ROLLED FULL HARD STEEL SHEET, METHOD FOR PRODUCING STEEL SHEET, AND METHOD FOR PRODUCING PLATED STEEL SHEET

TECHNICAL FIELD

This application relates to steel sheets, plated steel sheets, a method for producing hot-rolled steel sheets, a method for producing cold-rolled full hard steel sheets, a method for producing steel sheets, and a method for producing plated steel sheets.

BACKGROUND

In recent years, improvement of fuel economy of automobiles has become an important issue in view of global environment conservation. For this reason, development has been aggressively carried out to reduce the wall thickness of automobiles by increasing the strength of materials therefor so as to reduce the weight of the automobile body itself. However, the increase in the strength of the steel sheet leads to a decrease in ductility, that is, a decrease in forming workability, and therefore development of a material having both high strength and high workability is desired. To meet such demands, dual-phase steel (DP steel) of ferrite and martensite has been developed so far.

For example, PTL 1 discloses DP steel having high ductility, and PTL 2 discloses DP steel having excellent stretch flange formability as well as ductility.

However, since such DP steel has a composite microstructure of a hard phase and a soft phase as a basic microstructure, it has a problem that fatigue properties is inferior, which is an obstacle to practical application at a site where fatigue properties are required.

To cope with such a problem, PTL 3 discloses a technique for improving fatigue resistance of DP steel by forming a fine DP microstructure in a manner of adding Ti and Nb in large amounts to inhibit recrystallization of ferrite during annealing, heating the steel to a temperature equal to or higher than an $A_3$ transformation temperature, and then cooling it to an Ms point or lower after retaining it for 60 seconds or longer in a dual-phase region of ferrite and austenite during cooling. In addition, PTL 4 discloses a high-strength steel sheet having good fatigue properties by adjusting compositions to an appropriate range, forming into a composite microstructure, in which ferrite is a main phase, and martensite or martensite and residual austenite is a secondary phase, and defining the size of Cu particle in the ferrite, and a method for manufacturing the same.

CITATION LIST

Patent Literature

PTL 1: JP-A-58-22332
PTL 2: JP-A-11-350038
PTL 3: JP-A-2004-149812
PTL 4: JP-A-11-199973

SUMMARY

Technical Problem

However, the steel sheet disclosed in disclosed in PTL 3 or PTL 4 has a tensile strength (TS) of 1100 MPa or less, and thus it is necessary to further increase the strength for the reduction in the weight of automobiles.

The disclosed embodiments have been made under these circumstances, and it is an object of the disclosed embodiments to provide a steel sheet having excellent fatigue resistance as a material for automobile parts and a TS of 1180 MPa or more, and a method for producing the steel sheet. The disclosed embodiments are also intended to provide a plated steel sheet obtained by plating the steel sheet, a method for producing a hot-rolled steel sheet needed to obtain the steel sheet, a method for producing a cold-rolled full hard steel sheet, and a method for producing the plated steel sheet.

Solution to Problem

The present inventors conducted intensive studies from the viewpoint of a composition and a microstructure of a steel sheet to produce a steel sheet having excellent fatigue resistance using a continuous annealing line or a continuous hot-dip galvanizing line. Consequently, the inventors found that the fatigue properties of the steel sheet having TS of 1180 MPa was degraded as the average concentration of solute Mn in the ferrite of the surface layer decreased.

As a known fact, the fatigue strength of the steel sheet is greatly influenced by the ferrite surface layer of the base steel and the strengthening of ferrite in the surface of steel sheet having composite microstructure including soft-phase ferrite is effective for improving fatigue properties of the steel sheet. As a method for strengthening ferrite, solid-solution strengthening due to Mn or the like is a typical method for strengthening ferrite; however, since Mn is an element which is more easily oxidized than Fe and forms Mn-based oxides due to external oxidation or internal oxidation in the vicinity of the surface of the steel sheet during coiling of hot rolling or annealing, the concentration of solute Mn in ferrite consequently decreases. The fatigue properties of the steel sheet decrease due to the decrease of the concentration of solute Mn in ferrite near the surface layer of the base steel, and in particular, the fatigue properties greatly decrease in the steel sheet having TS of 1,180 MPa or more.

The present inventors found that fatigue resistance was greatly improved in the steel sheet having TS of 1,180 MPa or more when the average concentration of solute Mn in ferrite in the surface layer of the base steel, which is referred to as a region from the surface of the base steel to a depth of 0.5 µm in the disclosed embodiments, was 60% or more relative to the average concentration of solute Mn in ferrite at a location of ¼ in the steel sheet thickness.

The disclosed embodiments are based on the above findings, and the configuration is as follows.

[1] A steel sheet having a composition containing, in mass %, C: 0.08% or more and 0.3% or less, Si: 1.0% or less, Mn: 2.0% or more and 3.5% or less, P: 0.1% or less, S: 0.01% or less, Al: 0.01% or more and 0.1% or less, N: 0.015% or less, and the balance being Fe and unavoidable impurities, and having a steel microstructure of 50% or more and 90% or less of martensite, and 10% to 50% of ferrite and bainite in total, in terms of an area ratio, and an average concentration of solute Mn in ferrite in a region from a surface of a base steel to a depth of 0.5 µm is 60% or more relative to an average concentration of solute Mn in ferrite at a location of ¼ in the thickness of the steel sheet.

[2] The steel sheet according to item [1], wherein the composition further includes, in mass %, at least one selected from the group consisting of Ti: 0.01% or more and 0.2% or less, and Nb: 0.01% or more and 0.2% or less.

[3] The steel sheet according to item [1] or [2], wherein the composition further includes, in mass %, at least one selected from the group consisting of Cr: 0.05% or more and 1.0% or less, Mo: 0.05% or more and 1.0% or less, and V: 0.01% or more and 1.0% or less.

[4] The steel sheet according to any one of items [1] to [3], wherein the composition further includes, in mass %, B: 0.0003% or more and 0.005% or less.

[5] The steel sheet according to any one of items [1] to [4], wherein the composition further includes, in mass %, at least one selected from the group consisting of Ca: 0.001% or more and 0.005% or less, and Sb: 0.003% or more and 0.03% or less.

[6] A plated steel sheet including a plating layer on a surface of the steel sheet of any one of items [1] to [5].

[7] The plated steel sheet according to item [6], wherein the plating layer is a hot-dip galvanized layer.

[8] The plated steel sheet according to item [7], wherein the hot-dip galvanized layer is a hot-dip galvannealed layer.

[9] A method for producing a hot-rolled steel sheet, including:
hot rolling a steel slab having the composition of any one of items [1] to [5]; and
coiling the hot-rolled steel sheet at a coiling temperature of 350° C. or higher and 550° C. or lower.

[10] A method for producing a cold-rolled full hard steel sheet, including:
cold rolling the hot-rolled steel sheet obtained by the method of item [9] at a cold-rolling ratio of 30 to 95%.

[11] A method for producing a steel sheet, including:
heating the cold-rolled full hard steel sheet obtained by the method of item [10] up to a temperature of 800° C. to 900° C. at an average heating rate of 20° C./s or lower in a temperature range from 500° C. to 750° C.;
retaining the heated cold-rolled full hard steel sheet for 10 seconds or longer;
annealing the steel sheet at a dew point of −40° C. or lower in a temperature range of 750° C. or higher at the time of retaining; and subsequently cooling the steel sheet to 550° C. or lower at an average cooling rate of 3° C./s or more.

[12] A method for producing a plated steel sheet, including:
plating the steel sheet obtained by the method of item [11].

[13] The method for producing a plated steel sheet according to item [12], wherein, the plating is a hot-dip galvanizing processing.

[14] The method for producing a plated steel sheet according to item [13], further including:
alloying the hot-dip galvanized steel sheet for 5 s to 60 s in a temperature range of 480° C. to 560° C. after the hot-dip galvanizing treatment.

Advantageous Effects

The disclosed embodiments enable producing a steel sheet having excellent fatigue properties with high strength of 1180 MPa or more.

DETAILED DESCRIPTION

An embodiment of the disclosed embodiments is described below. The scope of this disclosure is not intended to be limited to any of the following specific embodiments.

The disclosed embodiments include a steel sheet, a plated steel sheet, a method for producing hot-rolled steel sheets, a method for producing cold-rolled full hard steel sheets, a method for producing steel sheets, and a method for producing plated steel sheets. The following firstly describes how these are related to one another.

The steel sheet of the disclosed embodiments is produced from a starting steel material such as a slab through producing processes that produce a hot-rolled steel sheet and a cold-rolled full hard steel sheet. Further, the plated steel sheet of the disclosed embodiments is obtained from plating of the steel sheet.

The method for producing a hot-rolled steel sheet of the disclosed embodiments is a part of the foregoing processes that produces a hot-rolled steel sheet.

The method for producing a cold-rolled full hard steel sheet of the disclosed embodiments is a part of the foregoing processes that produces a cold-rolled full hard steel sheet from the hot-rolled steel sheet.

The method for producing a steel sheet of the disclosed embodiments is a part of the foregoing processes that produces a steel sheet from the cold-rolled full hard steel sheet.

The method for producing a plated steel sheet of the disclosed embodiments is a part of the foregoing processes that produces a plated steel sheet from the steel sheet.

Because of these relationships, the hot-rolled steel sheet, the cold-rolled full hard steel sheet, and the steel sheet, plated steel sheet share the same composition. Likewise, the steel sheet and the plated steel sheet share the same steel microstructure. The following describes such common features first, followed by the hot-rolled steel sheet, the steel sheet, the plated steel sheet, and the methods for producing these steel sheets, in this order.

<Composition of Steel Sheet and Plated Steel Sheet>

The steel sheet and the plated steel sheet have a composition containing, in mass %, C: 0.08% or more and 0.3% or less, Si: 1.0% or less, Mn: 2.0% or more and 3.5% or less, P: 0.1% or less, S: 0.01% or less, Al: 0.01% or more and 0.1% or less, N: 0.015% or less, and the balance being Fe and unavoidable impurities.

The composition may further contain, in mass %, at least one selected from the group consisting of Ti: 0.01% or more and 0.2% or less, and Nb: 0.01% or more and 0.2% or less.

The composition may further contain, in mass %, at least one selected from the group consisting of Cr: 0.05% or more and 1.0% or less, Mo: 0.05% or more and 1.0% or less, and V: 0.01% or more and 1.0% or less.

The composition may contain, in mass %, B: 0.0003% or more and 0.005% or less.

The composition may contain, in mass %, at least one selected from the group consisting of Ca: 0.001% or more and 0.005% or less, and Sb: 0.003% or more and 0.03% or less.

The following describes each composition. In the following description, "%" representing the content of each composition means "mass %".

C: 0.08% or More and 0.3% or Less

C is an element that is indispensable for forming martensite and ensuring desired strength. For this reason, the necessary content of C is 0.08% or more. On the other hand, when the C content exceeds 0.3%, weldability deteriorates. For this reason, the C content is limited to the range of 0.08% or more and 0.3% or less. Preferably, the lower limit of the C content is 0.1% or more. Preferably, the upper limit of the C content is 0.25% or less.

Si: 1.0% or Less

Si is an element that is effective for strengthening steel. However, when Si content exceeds 0.1%, chemical conversion treatability and plating properties deteriorates. For this reason, Si content is 1.0% or less, preferably 0.6% or less, and more preferably 0.5% or less.

Mn: 2.0% or More and 3.5% or Less

Mn is an element that is effective for strengthening steel, and is required to be 2.0% or more in order to ensure desired strength. On the other hand, when Mn is contained in excess of 3.5%, deterioration of weldability formability is caused. Therefore, Mn content is 2.0% or more and 3.5% or less. The lower limit of Mn content is preferably 2.2% or more. The upper limit of Mn content is preferably 2.8% or less.

P: 0.1% or Less

P is an element that is effective for strengthening steel. When P content exceeds 0.1%, deterioration in workability and toughness is caused. Accordingly, P content is 0.1% or less.

S: 0.01% or Less

S forms inclusions such as MnS to cause deterioration of formability, and therefore the content thereof is preferably as low as possible. However, S content is 0.01% or less from the viewpoint of production costs.

Al: 0.01% or More and 0.1% or Less

Al is an element that acts as a deoxidizing agent and is effective for cleanliness of steel, and is preferably added in a deoxidization process. In this process, such an effect is not achieved when Al content is less than 0.01%, and therefore the lower limit is 0.01%. However, the excessive content of Al leads to deterioration of slab quality in a steelmaking process. Accordingly, Al content is 0.1% or less.

N: 0.015% or Less

When N content exceeds 0.015%, coarse AlN increases inside the steel sheet and fatigue properties deteriorate. For this reason, N content is 0.015% or less, preferably 0.010% or less.

The steel sheet and the plated steel sheet of the disclosed embodiments have the basic composition described above.

The composition may contain at least one selected from Ti and Nb, if necessary.

Ti: 0.01% or More and 0.2% or Less, Nb: 0.01% or More and 0.2% or Less

Ti and Nb are contained for the purpose of increasing the strength of steel by precipitation hardening. In order to ensure the desired strength, the lower limit of each element to be contained is preferably set to 0.01%. On the other hand, when the content of Ti and Nb exceeds 0.2%, the effect becomes saturated and deterioration of formability is caused. For this reason, the upper limit of Ti and Nb to be contained is preferably 0.2%. The lower limit of the Ti content is further preferably 0.03% or more, and the upper limit thereof is further preferably 0.1% or less. The lower limit of the Nb content is further preferably 0.03% or more, and the upper limit thereof is further preferably 0.1% or less.

The composition may contain at least one selected from Cr, Mo, and V, if necessary.

Cr: 0.05% or More and 1.0% or Less, Mo: 0.05% or More and 1.0% or Less, V: 0.01% or More and 1.0% or Less Cr, Mo, and V are elements that are effective for increasing hardenability to strengthen steel. Such an effect can be obtained in a case of Cr: 0.05% or more, Mo: 0.05 or more, and V: 0.01% or more. However, when these elements are contained in amounts of Cr: exceeding 1.0%, Mo: exceeding 1.0%, or V: exceeding 1.0%, formability deteriorates. Therefore, these elements are contained in amounts of Cr: 0.05% or more and 1.0% or less, Mo: 0.05% or more and 1.0% or less, and V: 0.05% or more and 1.0% or less, when these elements are contained. The lower limit of Cr content is further preferably 0.1% or more, and the upper limit thereof is further preferably 0.5% or less. The lower limit of Mo content is further preferably 0.1% or more, and the upper limit thereof is further preferably 0.5% or less. The lower limit of V content is further preferably 0.02% or more, and the upper limit thereof is further preferably 0.5% or less.

The composition may further contain boron (B), if necessary.

B: 0.0003% or More and 0.005% or Less

B is an element that has an effect of improving hardenability and can be contained as needed. Such an effect can be obtained when B content is 0.0003% or more. However, when B content exceeds 0.005%, such an effect is saturated and costs increase. Accordingly, B content is 0.0003% or more and 0.005% or less, when B is contained. The lower limit thereof is further preferably 0.0005% or more. The upper limit thereof is further preferably 0.003% or less.

The composition may further contain at least one selected from Ca and Sb, if necessary.

Ca: 0.001% or More and 0.005% or Less

Ca is an element that is effective for decreasing an adverse effect of sulfides on formability by spheroidizing sulfides. In order to obtain such an effect, it is necessary that Ca content is 0.001% or more. Meanwhile, when Ca content is excessive, inclusions increase, resulting in causing surface and internal defects, for example. Accordingly, Ca content is 0.001% or more and 0.005% or less, when Ca is contained.

Sb: 0.003% or More and 0.03% or Less

Sb has an effect of inhibiting decarburization on a surface layer of the steel sheet and improving fatigue properties. In order to obtain such an effect, Sb content is preferably 0.003% or more. However, when Sb content exceeds 0.03%, the rolling load increases at the time for producing the steel sheet and thus productivity may deteriorate. Therefore, Sb content is 0.003% or more and 0.03% or less, when Sb is contained. The lower limit is further preferably 0.005% or more. The upper limit is further preferably 0.01% or less.

The balance is Fe and unavoidable impurities.

The microstructure of the steel sheet and the plated steel sheet will be described below.

Area Ratio of Martensite: 50% or More and 90% or Less

Martensite acts to increases the strength of steel and is required to have an area ratio of 50% or more relative to the entire steel sheet in order to obtain the desired strength. However, when the area ratio exceeds 90%, the strength excessively increases and formability deteriorates. For this reason, the area ratio of martensite is 50% or more and 90% or less, and preferably 50% or more and 80% or less.

Total Area Ratio of Ferrite and Bainite: 10 to 50%

In order to obtain excellent ductility, a total area ratio of ferrite and bainite is required to be 10% or more in terms of an area ratio relative to the entire steel sheet. On the other hand, when the total area ratio of ferrite and bainite exceeds 50%, the desired strength is hardly obtained. For this reason, the total area ratio of ferrite and bainite is 10 to 50%. The lower limit thereof is preferably 20% or more. The upper limit thereof is preferably 40% or less, more preferably less than 40%, and further preferably 38% or less.

The steel sheet of the disclosed embodiments may include phases such as a residual austenite phase in addition to the phase microstructure described above.

Average Concentration of Solute Mn in Ferrite in Region from Surface of Base Steel to Depth of 0.5 μm: 60% or More relative to Average Concentration of Solute Mn in Ferrite at Location of ¼ in Sheet Thickness When an average concentration of solute Mn in ferrite in a region from the surface of the base steel to a depth of 0.5 μm is less than 60% relative to an average concentration of solute Mn in ferrite at a location of ¼ in a sheet thickness, the desired fatigue properties can hardly be obtained. For this reason, the average concentration of solute Mn in ferrite in the region from the surface of the base steel to the depth of 0.5 μm is set to be 60% or more relative to the average concentration of solute Mn in ferrite at the location of ¼ in the sheet thickness, and preferably 80% or more. In order to inhibit the reduction of the concentration of solute Mn in the surface of the base steel as described above, it is necessary to control a coiling temperature in hot rolling and a dew point during annealing under appropriate conditions.

<Steel Sheet>

The composition and the steel microstructure of the steel sheet are as described above. In addition, the thickness of the steel sheet is not particularly limited, and is typically 0.7 mm to 2.3 mm.

<Plated Steel Sheet>

The plated steel sheet of the disclosed embodiments is a plated steel sheet including a plating layer on a surface of the steel sheet of the disclosed embodiments. The plating layer is not particularly limited, and may be, for example, a hot-dip plating layer or an electroplating plating layer. Further, the plating layer may also be an alloyed plating layer. The plating layer is preferably a galvanized layer. The galvanized layer may contain Al or Mg. Hot-dip zinc-aluminum-magnesium alloy plating (Zn—Al—Mg plating layer) is also preferred. In this case, Al content is preferably 1 mass % or more and 22 mass % or less, and Mg content is preferably 0.1 mass % or more and 10 mass % or less. The Zn—Al—Mg plating layer also may contain at least one selected from Si, Ni, Ce, and La in a total amount of 1 mass % or less. The plating metal is not particularly limited, and metals such as aluminum may be plated, other than zinc described above.

The composition of the plating layer is not particularly limited, and the plating layer may have a common composition. For example, the plating layer may preferably be a hot-dip galvanized layer with the plating metal in an amount of deposition of 20 g/m² to 80 g/m² for each side, or a hot-dip galvannealed layer produced as an alloyed layer of the galvanized layer. When the plating layer is a hot-dip galvanized layer, Fe content in the plating layer is less than 7 mass %. In the case of a hot-dip galvannealed layer, Fe content in the plating layer is 7 mass % to 15 mass %.

<Method for Producing Hot-Rolled Steel Sheet>

Production conditions will be described below.

In a method for producing a hot-rolled steel sheet of the disclosed embodiments, a steel having the above-described composition for the "steel sheet and the plated steel sheet" is melted using a converter furnace or the like and is then cast into a slab by a continuous casting method or the like. In the method, the slab is subjected to hot rolling to make a hot-rolled steel sheet, the hot-rolled steel sheet is subjected to pickling and cold rolling to make a cold-rolled full hard steel sheet, and the cold-rolled full hard steel sheet is subjected to continuous annealing. When the surface of the steel sheet is not subjected to plating, annealing is performed in a continuous annealing line (CAL), and when the surface is subjected to hot-dip galvanizing or hot-dip galvannealing, annealing is performed in a continuous hot-dip galvanizing line (CGL).

Each of the conditions will be described below. In the following description, the temperature means a surface temperature of the steel sheet unless otherwise specified. The surface temperature of the steel sheet may be measured using, for example, a radiation thermometer. The average cooling rate is represented by ((surface temperature before cooling−surface temperature after cooling)/cooling time).

Production of Steel Slab

The melting method for production of the steel slab is not particularly limited, and various known melting methods may be used, including, for example, a method using a converter furnace and a method using an electric furnace. It is also possible to perform secondary refining with a vacuum degassing furnace. After that, preferably, the slab (steel material) may be produced by a known continuous casting method from the viewpoint of productivity and quality. Further, the slab may be produced using known casting methods such as ingot casting-slabbing rolling and thin-slab continuous casting.

Heating of Steel Slab

A method of hot rolling the steel slab may include, for example, rolling the slab after heating, rolling the slab directly after continuous casting without heating the slab, or rolling the slab after continuous casting after subjecting the slab to heat treatment for a short time. The heating temperature of the slab may be 1,100° C. to 1,320° C.

Hot-Rolling Condition

With regard to the hot-rolling condition, the average concentration of solute Mn in ferrite in the region from the surface of the base steel to the depth of 0.5 μm can be 60% or more relative to the average concentration of solute Mn in ferrite at the location of ¼ in the sheet thickness by setting a coiling temperature during hot-rolling being in a range of 350° C. or higher and 550° C. or lower. The upper limit of the coiling temperature is preferably lower than 500° C., and more preferably 480° C. or lower.

<Method for Producing Cold-Rolled Full Hard Steel Sheet>

A method for producing a cold-rolled full hard steel sheet of the disclosed embodiments is a method for performing cold rolling on the hot-rolled steel sheet obtained by the above-described method.

In the cold rolling conditions, the cold-rolling ratio is necessary to be 30% or more in order to form recrystallized ferrite at the time of annealing and ensure workability. However, when the cold-rolling ratio exceeds 95%, the rolling load excessively increases and productivity decreases. Accordingly, the cold-rolling ratio is 30 to 95%. The lower limit of the cold-rolling ratio is preferably 40% or more. The upper limit of the cold-rolling ratio is preferably 70% or less.

Pickling may be performed before the cold rolling. The pickling conditions may be appropriately set.

<Method for Producing Steel Sheet>

A method for producing a steel sheet of the disclosed embodiments is a method that includes: heating the cold-rolled full hard steel sheet obtained by the above-described method up to a temperature of 800° C. to 900° C. at an average heating rate of 20° C./s or lower in a temperature range from 500° C. to 750° C.; retaining the heated cold-rolled full hard steel sheet for 10 seconds or longer; annealing the steel sheet at a dew point of −40° C. or lower in a temperature range of 750° C. or higher at the time of retaining; and subsequently cooling the steel sheet to 550° C. or lower at an average cooling rate of 3° C./s or more.

Average Heating Rate in Temperature Range from 500° C. to 750° C.: 20° C./s or Lower When the average heating rate in the range of 500° C. to 750° C. exceeds 20° C./s, recovery and recrystallization at the time of heating become insufficient, and dislocations introduced into the steel sheet by cold rolling remain. As a result, the oxidation of Mn and Si in the vicinity of the surface layer of the steel sheet is facilitated, the concentration of solute Mn and Si in the ferrite in the vicinity of the surface layer is reduced, and thus the fatigue properties of the steel sheet deteriorate. Therefore, the average heating rate in the range of 500° C. to 750° C. is 20° C./s or less, and preferably 15° C./s or less.

Heating up Temperature 800° C. to 900° C. and Retention for 10 Seconds or Longer When the heating temperature is lower than 800° C. or the retention time is shorter than 10 seconds, re-austenization becomes insufficient and a desired amount of martensite cannot be obtained after annealing. On the other hand, when the heating temperature exceeds 900° C., the oxidation of Mn and Si at the surface layer occurs, whereby the fatigue properties deteriorate. For this reason, the heating condition is 10 seconds or longer at the temperature of 800° C. to 900° C., preferably 30 seconds or longer at the temperature of 830° C. to 880° C.

The heating rate in the temperature range of 750° C. or higher is not particularly limited.

Dew Point in Temperature Range of 750° C. or Higher: −40° C. or Lower

The oxygen potential in the annealing step decreases as the dew point at the time of annealing lowers, and thus the activity of the easily oxidized elements Mn and Si in the surface layer of the steel sheet decrease. Then, oxidation of these elements in the vicinity of the surface layer of the steel sheet is suppressed and the fatigue properties are effectively improved. Since such effects are obtained when the dew point is −40° C. or lower, the dew point in the temperature range of 750° C. or higher should be −40° C. or lower, and preferably −55° C. or lower. The lower limit of the dew point of the atmosphere is not particularly specified. However, the dew point is preferably −80° C. or higher because the effect becomes saturated when the dew point is lower than −80° C., and poses cost disadvantages. The temperature in the above-described temperature range is based on the surface temperature of the steel sheet. Specifically, the dew point is adjusted in the above-described range when the surface temperature of the steel sheet is in the above-described temperature range.

Cooling to 550° C. or lower at Average Cooling Rate of 3° C./s or More

If the average cooling rate is less than 3° C./s, the desired strength can hardly be obtained due to excessive ferrite formation and pearlite formation during cooling, so the average cooling rate should be 3° C./s or more. The upper limit of the average cooling rate is not specified in particular, but is preferably 100° C./s or lower because the shape of the steel sheet deteriorates when the cooling rate becomes too fast. The lower limit thereof is more preferably 5° C./s or more. The upper limit thereof is more preferably 50° C./s or less.

<Method for Producing Plated Steel Sheet>

A method for producing a plated steel sheet of the disclosed embodiments is a method by which the steel sheet obtained above is plated. Plating may be, for example, a hot-dip galvanizing process, or a process that involves alloying after hot-dip galvanizing. Annealing and galvanizing may be continuously performed on the same line. The plating layer may be formed by electroplating such as electroplating of a Zn—Ni alloy, or may be formed by hot-dip plating of a zinc-aluminum-magnesium alloy. Preferred is galvanizing, as described above in conjunction with the plating layer. It is, however, possible to perform plating using other metals such as aluminum.

Although the plating conditions are not particularly limited, in the case of performing hot-dip galvanizing, the alloying treatment condition after hot-dip galvanizing is preferably 5 to 60 s in the temperature range of 480° C. to 560° C. When the temperature is lower than 480° C. or the time is shorter than 5 s, the alloying of the plating does not sufficiently proceed. Conversely, when the temperature exceeds 560° C. or the time exceeds 60 s, the alloying excessively proceeds and the powdering property of the plating deteriorates. For this reason, the alloying conditions are 480° C. to 560° C. and 5 s to 60 s, preferably 500° C. to 540° C. and 10 s to 40 s.

EXAMPLES

Example 1

Steels of the compositions shown in Table 1 were melted with a converter furnace, and prepared into a slab by continuous casting. The steel slabs were subjected to hot rolling under the conditions shown in Table 2 to produce hot-rolled steel sheets having a thickness of 3.0 mm. After pickling, the steel sheets were cold rolled to a thickness of 1.4 mm to obtain cold-rolled steel sheets. The hot-rolled steel sheets and the cold-rolled steel sheets were annealed. Annealing was carried out on a continuous annealing line (CAL) for non-plated steel sheets, and carried out on a continuous hot-dip galvanizing line (CGL) for hot-dip galvanized steel sheets and hot-dip galvannealed steel sheets. Table 2 shows the conditions of CAL and CGL. As for conditions of the hot-dip galvanizing treatment, the steel sheets were dipped in a plating bath at a bath temperature of 475° C. and then pulled up, and a depositing weight of the plating was adjusted variously by gas wiping. For some of the steel sheets, alloying treatment was performed under conditions shown in Table 2.

TABLE 1

| | (mass %) | | | | | | | | | | | | | | |
|---|---|---|---|---|---|---|---|---|---|---|---|---|---|---|---|
| Steel | C | Si | Mn | P | S | Al | N | Ti | Nb | Cr | Mo | V | B | Ca | Sb | Remarks |
| A | 0.12 | 0.4 | 2.9 | 0.016 | 0.003 | 0.035 | 0.005 | | | | | | | | | Example |
| B | 0.15 | 0.3 | 2.7 | 0.025 | 0.003 | 0.029 | 0.006 | 0.04 | | | | | | | | Example |
| C | 0.18 | 0.6 | 2.5 | 0.015 | 0.002 | 0.033 | 0.004 | | 0.06 | | | | | | | Example |
| D | 0.09 | 0.4 | 3.0 | 0.012 | 0.002 | 0.035 | 0.003 | | | 0.6 | | | | | | Example |

TABLE 1-continued (mass %)

| Steel | C | Si | Mn | P | S | Al | N | Ti | Nb | Cr | Mo | V | B | Ca | Sb | Remarks |
|---|---|---|---|---|---|---|---|---|---|---|---|---|---|---|---|---|
| E | 0.15 | 0.1 | 2.2 | 0.031 | 0.004 | 0.041 | 0.002 | | | 0.4 | | | | | | Example |
| F | 0.13 | 0.02 | 3.2 | 0.042 | 0.002 | 0.035 | 0.004 | | | | 0.3 | | | | | Example |
| G | 0.17 | 0.2 | 2.5 | 0.015 | 0.001 | 0.038 | 0.006 | 0.02 | | | | 0.002 | | | | Example |
| H | 0.25 | 0.3 | 2.3 | 0.021 | 0.002 | 0.045 | 0.005 | | | | | | 0.003 | | | Example |
| I | 0.14 | 0.5 | 2.7 | 0.016 | 0.002 | 0.025 | 0.004 | | | | | | | | 0.003 | Example |
| J | 0.06 | 0.2 | 2.3 | 0.035 | 0.002 | 0.033 | 0.005 | | | | | | | | | Comparative Example |
| K | 0.13 | 0.3 | 1.7 | 0.021 | 0.002 | 0.045 | 0.003 | | | | | | | | | Comparative Example |

TABLE 2

| | | Hot rolling conditions | Cold rolling conditions | | Annealing conditions | | | | | | Alloying condition | |
|---|---|---|---|---|---|---|---|---|---|---|---|---|
| | | | | | Average heating rate between | | | Dew point at temperature | Average | Cooling | | |
| No. | Steel | Coiling temperature (° C.) | Rolling ratio (%) | Line | 500 and 750° C. (° C./s) | Heating temperature (° C.) | Retention time (s) | range of 750° C. or more (° C.) | heating rate (° C./s) | stop temperature (° C.) | Alloying temperature (° C.) | Time (s) |
| 1 | A | 450 | 65 | CAL | 12 | 810 | 150 | −55 | 15 | 400 | — | — |
| 2 | A | 520 | 65 | CAL | 40 | 820 | 150 | −60 | 15 | 400 | — | — |
| 3 | A | 420 | 65 | CAL | 10 | 810 | 150 | −25 | 15 | 400 | — | — |
| 4 | A | 630 | 65 | CAL | 12 | 820 | 150 | −30 | 15 | 400 | — | — |
| 5 | B | 500 | 50 | CGL | 7 | 830 | 60 | −60 | 10 | 480 | 530 | 30 |
| 6 | B | 440 | 55 | CGL | 12 | 760 | 60 | −60 | 10 | 480 | 530 | 30 |
| 7 | B | 470 | 60 | CGL | 10 | 820 | 120 | −30 | 5 | 480 | 530 | 30 |
| 8 | C | 380 | 35 | CAL | 5 | 800 | 180 | −70 | 5 | 350 | — | — |
| 9 | C | 400 | 40 | CAL | 8 | 920 | 30 | −60 | 5 | 350 | — | — |
| 10 | C | 420 | 35 | CAL | 8 | 820 | 120 | −20 | 30 | 400 | — | — |
| 11 | D | 440 | 55 | CGL | 8 | 830 | 180 | −50 | 10 | 460 | — | — |
| 12 | D | 400 | 50 | CGL | 8 | 810 | 3 | −50 | 10 | 460 | — | — |
| 13 | D | 500 | 55 | CGL | 10 | 810 | 120 | −30 | 10 | 460 | — | — |
| 14 | E | 530 | 75 | CAL | 15 | 820 | 150 | −65 | 10 | 440 | — | — |
| 15 | E | 460 | 75 | CAL | 15 | 840 | 150 | −25 | 12 | 440 | — | — |
| 16 | F | 450 | 60 | CGL | 10 | 820 | 120 | −40 | 10 | 520 | 540 | 20 |
| 17 | F | 450 | 60 | CGL | 10 | 820 | 90 | −15 | 10 | 520 | 540 | 20 |
| 18 | G | 420 | 50 | CAL | 12 | 860 | 100 | −70 | 15 | 420 | — | — |
| 19 | G | 420 | 55 | CAL | 12 | 840 | 120 | −20 | 10 | 420 | — | — |
| 20 | H | 390 | 45 | CGL | 15 | 840 | 120 | −40 | 20 | 450 | 520 | 50 |
| 21 | H | 390 | 40 | CGL | 15 | 820 | 120 | −50 | 1 | 450 | 520 | 50 |
| 22 | I | 500 | 60 | CAL | 12 | 830 | 150 | −50 | 15 | 400 | — | — |
| 23 | J | 450 | 60 | CGL | 10 | 820 | 120 | −50 | 10 | 450 | 500 | 50 |
| 24 | K | 480 | 60 | CAL | 12 | 820 | 90 | −50 | 10 | 400 | — | — |

For the steel sheets obtained as described above, tensile characteristics, fatigue properties, steel sheet microstructure, and average concentration of solute Mn in ferrite were measured in the following manner.

The tensile test was carried out at a strain rate of $10^{-3}$/s using JIS No. 5 test pieces taken from a direction perpendicular to the rolling direction of the steel sheet to measure TS (tensile strength) and El (elongation). The test pieces were acceptable when the TS was 1,180 MPa or more, and the EL is 10% or more.

The fatigue properties were evaluated by a ratio (FL/TS) of a fatigue limit (FL) measured by a reversed plane bending test with a frequency of 20 Hz to the tensile strength TS. The test pieces were acceptable when the FL/TS was 0.47 or more.

The cross-sectional microstructures of the steel sheet were exposed using a 3% nital solution and were imaged at the location of ¼ in the plate thickness direction from the surface (location corresponding to one quarter of the plate thickness from the surface) using a scanning electron microscope (SEM) at a magnification of 3,000, and the area ratio of ferrite and martensite was quantified from the imaged photograph of the microstructure.

The average concentration of solute Mn in the ferrite was measured by TEM-EDS analysis using FIG-processed thin film cross-section sample. The measurements were made on arbitrary 10 points at a region from the surface of the steel sheet to the depth of 0.5 μm and a location of ¼ in the sheet thickness, and average values obtained by the measurement were respectively defined as the average concentration of solute Mn in the ferrite in the region from the surface of the base steel to the depth of 0.5 μm and the average concentration of solute Mn in the ferrite at the location of ¼ in the sheet thickness. Then, a ratio of the concentration of solute Mn in the ferrite at the surface of the base steel sheet with respect to the concentration of solute Mn in the ferrite at the location of ¼ in the sheet thickness. In the case of the plated steel sheet, a region from an interface between the plating and the base material to a depth of 0.5 μm toward the base material is defined as a surface of the steel sheet, and an average concentration of solute Mn was obtained.

Figure 1:
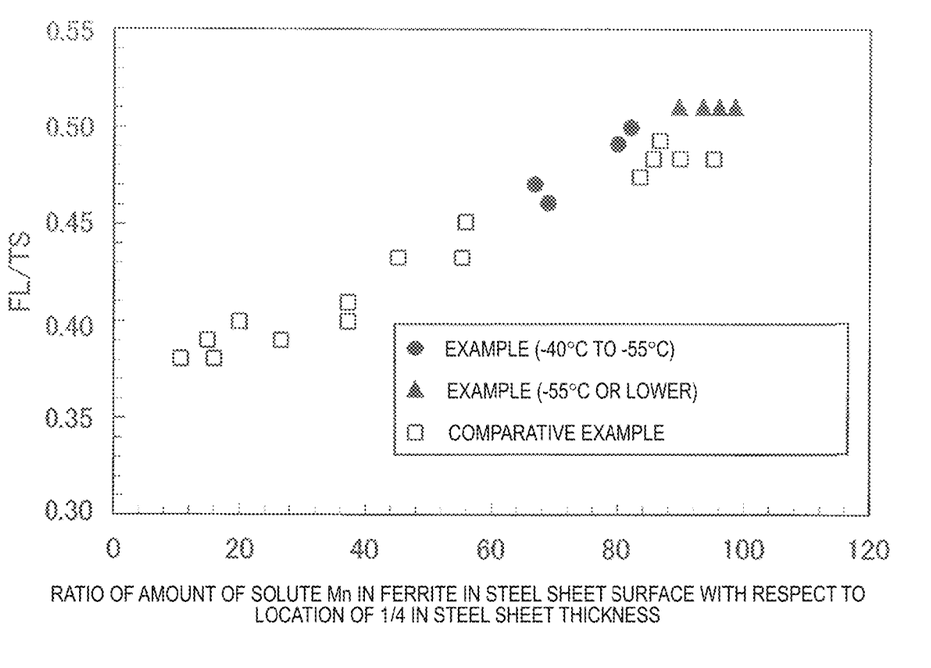
FIG. 1 is a diagram representing a relationship between a ratio of an average concentration of solute Mn in ferrite in a region from a surface of a base steel to a depth of 0.5 μm with respect to an average concentration of solute Mn in ferrite at a location of ¼ in the steel sheet thickness and FL/TS.

The results are shown in Table 3.

concentration of solute Mn in the ferrite in the ferrite at the location of ¼ in the thickness of the steel sheet, it can be seen that the FL/TS is 0.47 or more and the fatigue properties is excellent. In the present example in which the dew point is −55° C. or lower, it can be seen that the FL/TS is high and the fatigue properties is further excellent.

TABLE 3

| | Microstructure | | | Ratio of concentration of solute Mn in ferrite in surface relative to ¼-thickness part of steel sheet (%) | Tensile properties | | Fatigue properties | |
|---|---|---|---|---|---|---|---|---|
| No. | Area ratio of martensite (%) | Total area ratio of ferrite and bainite (%) | Other microstructure | | TS (MPa) | El (%) | FL/TS | Remarks |
| 1 | 65 | 35 | | 90 | 1300 | 11 | 0.51 | Example |
| 2 | 60 | 40 | | 55 | 1320 | 10 | 0.43 | Comparative Example |
| 3 | 67 | 33 | | 25 | 1315 | 11 | 0.39 | Comparative Example |
| 4 | 63 | 37 | | 43 | 1280 | 11 | 0.43 | Comparative Example |
| 5 | 68 | 32 | | 94 | 1320 | 10 | 0.51 | Example |
| 6 | 30 | 52 | Perlite | 94 | 810 | 20 | 0.48 | Comparative Example |
| 7 | 66 | 34 | | 35 | 1305 | 11 | 0.40 | Comparative Example |
| 8 | 55 | 40 | Residual γ | 98 | 1210 | 14 | 0.51 | Example |
| 9 | 85 | 15 | | 56 | 1420 | 9 | 0.45 | Comparative Example |
| 10 | 60 | 40 | | 15 | 1250 | 12 | 0.38 | Comparative Example |
| 11 | 63 | 37 | | 82 | 1270 | 11 | 0.50 | Example |
| 12 | 25 | 65 | Perlite | 83 | 700 | 25 | 0.47 | Comparative Example |
| 13 | 60 | 40 | | 35 | 1260 | 12 | 0.41 | Comparative Example |
| 14 | 53 | 47 | | 98 | 1190 | 13 | 0.51 | Example |
| 15 | 55 | 45 | | 20 | 1210 | 13 | 0.40 | Comparative Example |
| 16 | 73 | 27 | | 63 | 1355 | 10 | 0.48 | Example |
| 17 | 72 | 28 | | 14 | 1340 | 10 | 0.39 | Comparative Example |
| 18 | 68 | 32 | | 96 | 1335 | 11 | 0.51 | Example |
| 19 | 65 | 35 | | 10 | 1300 | 11 | 0.38 | Comparative Example |
| 20 | 70 | 30 | | 65 | 1340 | 10 | 0.47 | Example |
| 21 | 40 | 45 | Perlite | 85 | 920 | 17 | 0.48 | Comparative Example |
| 22 | 67 | 33 | | 81 | 1320 | 11 | 0.49 | Example |
| 23 | 38 | 62 | | 86 | 920 | 19 | 0.49 | Comparative Example |
| 24 | 35 | 65 | | 89 | 865 | 20 | 0.48 | Comparative Example |

As shown in Table 3, all the steel sheets and the plated steel sheets obtained according to the present examples have high tensile strength of 1,180 MPa or more and excellent fatigue properties. The relationship between the ratio of the average concentration of solute Mn in the ferrite in the surface of the base steel with respect to the average concentration of solute Mn in the ferrite at the location of ¼ in the sheet thickness and FL/TS is shown in FIG. 1. As shown in FIG. 1, when the average concentration of solute Mn in the ferrite in the region from the surface of the base steel to the depth of 0.5 μm is 60% or more relative to the average

The invention claimed is:

1. A steel sheet having a chemical composition comprising, by mass %:
C: 0.17% or more and 0.3% or less;
Si: 1.0% or less;
Mn: 2.0% or more and 3.5% or less;
P: 0.1% or less;
S: 0.01% or less;
Al: 0.01% or more and 0.1% or less;
N: 0.015% or less; and
the balance being Fe and unavoidable impurities, wherein the steel sheet has a steel microstructure in a range of 50% or more and 90% or less of martensite, and in a range of 10% to 50% of ferrite and bainite in total, in terms of an area ratio, and an average concentration of solute Mn in ferrite in a surface region from a surface of a base steel to a depth of 0.5 μm is 60% or more relative to an average concentration of solute Mn in ferrite at an inner location of ¼ in a thickness of the steel sheet.

2. The steel sheet according to claim 1, wherein the composition further comprises, by mass %, at least one Group selected from the group consisting of A, B, C, and D:

Group A: at least one selected from the group consisting of:
Ti: 0.01% or more and 0.2% or less, and
Nb: 0.01% or more and 0.2% or less, Group B: at least one selected from the group consisting of:
Cr: 0.05% or more and 1.0% or less,
Mo: 0.05% or more and 1.0% or less, and
V: 0.01% or more and 1.0% or less, Group C:
B: 0.0003% or more and 0.005% or less, and Group D: at least one selected from the group consisting of:
Ca: 0.001% or more and 0.005% or less, and
Sb: 0.003% or more and 0.03% or less.

3. A plated steel sheet comprising a plating layer disposed on a surface of the steel sheet of claim 1.

4. A plated steel sheet comprising a plating layer disposed on a surface of the steel sheet of claim 2.

5. The plated steel sheet according to claim 3, wherein the plating layer is a hot-dip galvanized layer.

6. The plated steel sheet according to claim 4, wherein the plating layer is a hot-dip galvanized layer.

7. The plated steel sheet according to claim 5, wherein the hot-dip galvanized layer is a hot-dip galvannealed layer.

8. The plated steel sheet according to claim 6, wherein the hot-dip galvanized layer is a hot-dip galvannealed layer.

9. The steel sheet according to claim 1, wherein the chemical composition comprises, by mass, C: 0.18% or more and 0.3% or less.

10. The steel sheet according to claim 1, wherein the chemical composition comprises, by mass, C: 0.25% or more and 0.3% or less.

11. The steel sheet according to claim 1, wherein the average concentration of the solute Mn in the ferrite in the surface region is 80% or more relative to the average concentration of the solute Mn in the ferrite at the inner location.

12. A method of producing a steel sheet as claimed in claim 1, the method comprising:

hot rolling a steel slab having the composition to obtain a hot-rolled steel sheet; and coiling the hot-rolled steel sheet at a coiling temperature in a range of 350° C. or higher and 550° C. or lower.

13. The method of producing a steel sheet according to claim 12, further comprising cold rolling the hot-rolled steel sheet at a cold-rolling ratio in a range of 30 to 95% to obtain a cold-rolled full hard steel sheet.

14. The method of producing a steel sheet according to claim 13, further comprising:

heating the cold-rolled full hard steel sheet up to a temperature in a range of 800° C. to 900° C. at an average heating rate of 20° C./s or lower in a temperature range from 500° C. to 750° C.;

retaining the heated cold-rolled full hard steel sheet for 10 seconds or longer;

annealing the steel sheet at a dew point of −40° C. or lower in a temperature range of 750° C. or higher at the time of retaining; and subsequently cooling the steel sheet to 550° C. or lower at an average cooling rate of 3° C./s or more.

15. A method of producing a plated steel sheet, the method comprising plating the steel sheet obtained by the method of claim 11.

16. The method of producing a plated steel sheet according to claim 15, wherein the plating includes hot-dip galvanizing.

17. The method of producing a plated steel sheet according to claim 16, further comprising alloying the hot-dip galvanized steel sheet for in a range of 5 s to 60 s in a temperature range of 480° C. to 560° C. after the hot-dip galvanizing treatment.

18. A method of producing a steel sheet as claimed in claim 2, the method comprising:

hot rolling a steel slab having the composition to obtain a hot-rolled steel sheet; and coiling the hot-rolled steel sheet at a coiling temperature in a range of 350° C. or higher and 550° C. or lower.

19. The method of producing a steel sheet according to claim 18, further comprising cold rolling the hot-rolled steel sheet obtained by the method of claim 18 at a cold-rolling ratio in a range of 30 to 95% to obtain a cold-rolled full hard steel sheet.

20. The method of producing a steel sheet according to claim 19, further comprising:

heating the cold-rolled full hard steel sheet up to a temperature in a range of 800° C. to 900° C. at an average heating rate of 20° C./s or lower in a temperature range from 500° C. to 750° C.;

retaining the heated cold-rolled full hard steel sheet for 10 seconds or longer;

annealing the steel sheet at a dew point of −40° C. or lower in a temperature range of 750° C. or higher at the time of retaining; and subsequently cooling the steel sheet to 550° C. or lower at an average cooling rate of 3° C./s or more.

21. A method of producing a plated steel sheet, the method comprising plating the steel sheet obtained by the method of claim 20.

22. The method of producing a plated steel sheet according to claim 21, wherein the plating includes hot-dip galvanizing.

23. The method of producing a plated steel sheet according to claim 22, further comprising alloying the hot-dip galvanized steel sheet for in a range of 5 s to 60 s in a temperature range of 480° C. to 560° C. after the hot-dip galvanizing treatment.

* * * * *